(12) United States Patent
Delke et al.

(10) Patent No.: US 12,366,484 B2
(45) Date of Patent: Jul. 22, 2025

(54) TEMPERATURE SENSOR

(71) Applicant: NXP B.V., Eindhoven (NL)

(72) Inventors: Alexander Sebastian Delke, Enschede (NL); Anne Johan Annema, Hengelo (NL); Jos Verlinden, Wachtendonk (DE); Bram Nauta, Borne (NL); Mike Jordens, Enschede (NL)

(73) Assignee: NXP B.V., Eindhoven (NL)

( * ) Notice: Subject to any disclaimer, the term of this patent is extended or adjusted under 35 U.S.C. 154(b) by 472 days.

(21) Appl. No.: 18/049,029

(22) Filed: Oct. 24, 2022

(65) Prior Publication Data

US 2023/0134106 A1 May 4, 2023

(30) Foreign Application Priority Data

Nov. 1, 2021 (EP) ..................................... 21205827

(51) Int. Cl.
*G01K 1/022* (2021.01)
*G01K 7/00* (2006.01)
*G01K 7/01* (2006.01)

(52) U.S. Cl.
CPC ............... *G01K 1/022* (2013.01); *G01K 7/00* (2013.01); *G01K 7/01* (2013.01)

(58) Field of Classification Search
CPC . G01K 1/022; G01K 7/01; G01K 7/00; H01L 35/00

See application file for complete search history.

(56) References Cited

U.S. PATENT DOCUMENTS 5,579,194 A * 11/1996 Mackenzie ............ H02H 6/005
361/28
2009/0129438 A1 5/2009 Pan

FOREIGN PATENT DOCUMENTS

CN 109916524 A 6/2019

OTHER PUBLICATIONS

Bakker, Anton et al.; "Micropower CMOS Temperature Sensor with Digital Output"; IEEE J. of Solid-State Circuits, vol. 31, No. 7; 5 pages (Jul. 1996).
Chuang, Mei-Chen, et al. "A temperature sensor with a 3 sigma inaccuracy of ±2° C. without trimming from −50° C. to 150° C. in a 16nm FinFET process." ESSCIRC Conference 2015—41st European Solid-State Circuits Conference (ESSCIRC). IEEE, 2015.
Gomes, Fransisco O.O et al., "A Low-Power RFID Enabled Temperature Sensor for Cold Chain Management", IEEE International Symposium on Circuits and Systems, May 24, 2015, pp. 2113-2116, IEEE, Piscataway, NJ, USA.
Heidary, Ali, et al. "12.8 A BJT-Based CMOS Temperature Sensor with a 3.6 pJ• K2-Resolution FoM"; IEEE International Solid-State Circuits Conference , Session 12, Sensors, Mems, and Displays, 12.8; 3 pages (Feb. 2014).

(Continued)

*Primary Examiner* — Joseph J Lauture

(57) ABSTRACT

A temperature sensor and method of temperature sensing is described. A first reference current is provided to a dual-slope ADC during a first slope time duration of a dual-slope ADC conversion cycle. A second reference current is provided to the dual-slope ADC during a second slope time duration of the dual-slope ADC conversion cycle. A digital codeword corresponding to a ratio of the first and second reference currents is then output by the dual-slope ADC. The first and second reference current ratio is related to the temperature.

20 Claims, 5 Drawing Sheets

(56) References Cited

OTHER PUBLICATIONS

Kim, Jung Pill et al. "A Low-Power 256-Mb SDRAM With an On-Chip Thermometer and Biased Reference Line Sensing Scheme", IEEE Journal of Solid-State Circuits, Feb. 1, 2003, pp. 329-337, vol. 38, No. 2, IEEE, Piscataway, NJ, USA.
Lu, Cho-Ying, et al. "An 8b Subthreshold Hybrid Thermal Sensor with ±1.07° C. Inaccuracy and Single-Element Remote-Sensing Technique in 22nm FinFET"; IEEE International Solid-State Circuits Conference—(ISSCC), Session 19, Sensors and Interfaces, 19.1; 3 pages (Feb. 2018).
Pan, Sining et al.; A CMOS Resistor-Based Temperature Sensor with a 10fJ-K2 Resolution FoM and 0.4° C. (3σ) Inaccuracy From −55° C. to 125 After a 1-point Trim; International Solid-State Circuits Conference—(ISSCC), Session 3, Analog Techniques 1, 3.6; IEEE Xplore; 3 pages (Feb. 2017).
Pertijs, Michiel Apet al; "A High-Accuracy Temperature Sensor with Second-Order Curvature Correction and Digital Bus Interface";€IEEE International Symposium on Circuits and Systems, vol. 1, Sydney, Australia; IEEE Xplore; 4 pages (Aug. 2002).
Someya, Teruki, et al. "An 11-nW CMOS Temperature-to-Digital Converter Utilizing Sub-Threshold Current at Sub-Thermal Drain Voltage"; €IEEE Journal of Solid-State Circuits, vol. 54, No. 3; 10 pages (Mar. 2019).
Wang, Bo, et al.; "A 10.6 pJ• K2 Resolution FoM Temperature Sensor Using Astable Multivibrator." €IEEE Transactions on Circuits and Systems II: Express Briefs, vol. 65, No. 7; 5 pages (Jul. 2018).
Yousefzadeh, Bahman et al.; A BJT-Based Temperature-to-Digital Converter With ±60mK (3σ) Inaccuracy From −55° C. to ±125° C. in 0.16-μm CMOS; IEEE Journal of Solid-State Circuits, vol. 52, No. 4; 9 pages (Apr. 2017).

* cited by examiner

400

440

450

500

520

540

TEMPERATURE SENSOR

CROSS-REFERENCE TO RELATED APPLICATIONS

This application claims the priority under 35 U.S.C. § 119 of European Patent application no. 21205827.5, filed on Nov. 1, 2021, the contents of which are incorporated by reference herein.

FIELD

This disclosure relates to a temperature sensor and a method of temperature sensing.

BACKGROUND

The circuit density and complexity of modern System-on-a-Chips (SoCs) have been increasing rapidly in the past few years. SoCs often require on-chip temperature sensors to monitor the die temperature for thermal protection and performance tuning. Temperature sensors may include a temperature sensing front-end and a read-out circuit that outputs the digital temperature data. For high temperature resolution, a sigma-delta ($\Sigma\Delta$) converter is typically used as a read-out circuit.

SUMMARY

Various aspects of the disclosure are defined in the accompanying claims. In a first aspect there is provided a temperature sensor comprising: a current reference configured to provide a first reference current and a second reference current, the first reference current having a different temperature dependency from that of the second reference current; and a dual-slope analog to digital converter, ADC, coupled to the current reference and having a clock input and a digital output; wherein the current reference is further configured to: provide a one of the first reference current and the second reference current, for a first slope time duration of a dual-slope ADC conversion cycle; and provide the other of the first reference current and the second reference current for a second slope time duration of the dual-slope ADC conversion cycle; and wherein the first slope time duration corresponds to a first reference current value, the second slope time duration relates to a second reference current value and wherein the dual-slope ADC is configured to output a digital value relating to a ratio of the first current reference value and the second reference current value, the ratio related to a temperature.

In one or more embodiments, the first reference current may comprise a complementary-to-absolute-temperature (CTAT) current, and the second reference current comprises a proportional-to-absolute-temperature (PTAT) current.

In one or more embodiments, the first reference current may comprise a PTAT current, and the second reference current comprises a CTAT current.

In one or more embodiments, one of the first reference current and the second reference current may vary dependent on the temperature and the other of the first reference current and the second reference current does not vary dependent on the temperature.

In one or more embodiments, the dual-slope ADC may comprise an integrator, the integrator may comprise a sampling capacitor and wherein a direction of the first reference current through the integrator is opposite to the direction of the second reference current.

In one or more embodiments, the first slope time duration may be a time for a voltage difference between a first and second terminal of the sampling capacitor to increase from a first voltage value to a second voltage value; and the second slope time duration may be a time for the voltage difference to decrease from the second voltage value to the first voltage value. In one or more embodiments, the first slope time duration may be a time for a voltage difference between a first and second terminal of the sampling capacitor to decrease from a first voltage value to a second voltage value; and the second slope time duration may be a time for the voltage difference to increase from the second voltage value to the first voltage value.

In one or more embodiments, the current reference may comprise: a first current reference terminal configured to a one of source and sink the first reference current; a second current reference terminal configured to a one of source and sink the second reference current; and wherein the dual-slope ADC may comprise: a controller having a first control input coupled to the clock input, a second control input, a first controller output coupled to the digital output, and a second controller output wherein the integrator comprises an integrator input and an integrator output coupled to the second control input; and wherein the dual-slope ADC further comprises: a multiplexer having a first multiplexer input coupled to the first current reference terminal, a second multiplexer input coupled to the second current reference terminal, a multiplexer output coupled to the integrator input and a multiplexer control input coupled to the second controller output; and; a multiplexer having a first multiplexer input coupled to the first current reference terminal, a second multiplexer input coupled to the second current reference terminal, a multiplexer output coupled to the integrator input and a multiplexer control input coupled to the second controller output; and wherein the controller is configured to control the multiplexer to couple the first current reference terminal to the integrator input for the first slope time duration and to couple the second current reference terminal to the integrator input for the second slope time duration.

In one or more embodiments, the sampling capacitor may be coupled between the integrator input and a ground; and the integrator may further comprise a first comparator having a first comparator first input coupled to a first reference voltage, a first comparator second input coupled to the integrator input, a first comparator enable input, and a first comparator output coupled to the integrator output; a switch coupled between the first comparator output and the integrator input and configured to be closed between dual-slope ADC conversion cycles and open for the first and second slope time duration; a second comparator having a second comparator first input coupled to a second reference voltage, a second comparator second input coupled to the integrator input, and a second comparator output coupled to the first comparator enable input; wherein the second reference voltage is greater than the first reference voltage and wherein the second comparator is configured to enable the first comparator in response to a sampling capacitor voltage being less than the second reference voltage and the first comparator is configured to output an end of conversion signal in response to the sampling capacitor voltage being less than or equal to the first reference voltage.

In one or more embodiments, the controller may comprise a switching control output, and the current reference may comprise a switching control input and a plurality of circuit elements for dynamic element matching; wherein the controller is further configured to control the current reference to change a circuit configuration of the current reference between a first dual-slope conversion cycle and a second dual-slope conversion cycle.

In one or more embodiments, the current reference may further comprise: a first plurality of current sources coupled to a first switching network; a second plurality of current sources coupled to a second switching network; a first chopping amplifier having a first chopping amplifier first input, a first chopping amplifier second input, and a first chopping amplifier output; a second chopping amplifier having a second chopping amplifier first input, a second chopping amplifier second input, and a second chopping amplifier output; a current mirror comprising a first bipolar transistor and a second bipolar transistor; a first resistor coupled between the second chopping amplifier second input and the second bipolar transistor; a second resistor coupled between the first chopping amplifier second input and a ground; wherein the first chopping amplifier first input is coupled to the second chopping amplifier first input and the first bipolar transistor; and wherein the switching control input comprises a first switching control input coupled to the first switching network; and a second switching control input coupled to the second switching network; and wherein the current reference is configured in a dual-slope conversion cycle to: switchably couple a first current source of the first plurality of current sources to the first current reference terminal; switchably couple a second current source the first plurality of current sources to the first chopping amplifier second input; switchably couple a first current source of the second plurality of current sources to the second current reference terminal; switchably couple a second current source of the second plurality of current sources to the first chopping amplifier first input, the second chopping amplifier first input, and the first bipolar transistor; and switchably couple a third current source of the second plurality of current sources to the second chopping amplifier second input, and the second bipolar transistor.

In one or more embodiments, the temperature sensor may further comprise: a trimmer coupled to the digital output and configured to trim the digital output value dependent on at least one trimming parameter and to output a trimmed digital output value relating to a temperature.

In one or more embodiments, the temperature sensor may further comprise: an averager coupled to the trimmer and configured to receive a plurality of trimmed digital output values from the trimmer; generate an average value of a plurality of the trimmed digital output values; and output the average value relating to a temperature.

In a second aspect, there is provided a method of temperature sensing comprising: providing a first reference current and a second reference current, the first reference current having a different temperature dependency from that of the second reference current; providing a one of the first reference current and the second reference current to a dual-slope ADC during a first slope time duration of a dual-slope ADC conversion cycle; providing the other of the first reference current and the second reference current to the dual-slope ADC during a second slope time duration of the dual-slope ADC conversion cycle; wherein the first slope time duration relates to a first reference current value, the second slope time duration relates to a second reference current value, and the method further comprises outputting a digital value from the dual-slope ADC, the digital value relating to a ratio of the first current reference value and the second reference current value, the ratio relating to a temperature.

In one or more embodiments, the first reference current may comprise a complementary-to-absolute-temperature (CTAT) current, and the second reference current comprises a proportional-to-absolute-temperature (PTAT) current.

In one or more embodiments, the first reference current may comprise a PTAT current, and the second reference current comprises a CTAT current.

In one or more embodiments, one of the first reference current and the second reference current varies dependent on the temperature and the other of the first reference current and the second reference current does not vary dependent on the temperature.

In a third aspect there is provided a temperature sensor comprising: a current reference having a current reference first terminal, and a current reference second terminal; wherein the current reference first terminal is configured to source or sink a first reference current and the current reference second terminal is configured to source or sink a second reference current, the first reference current having a different temperature dependency than the second reference current; a dual-slope analog to digital converter (ADC) comprising an integrator and having a clock input, a digital output, a dual-slope ADC terminal coupled to the current reference first terminal, and a dual-slope ADC second terminal coupled to the current reference second terminal; wherein the dual-slope ADC is further configured to: selectively couple one of the current reference first terminal and the current reference first terminal to the integrator for a first slope time duration of a dual-slope ADC conversion cycle; and selectively couple the other of the current reference first terminal and the current reference first terminal to the integrator for a second slope time duration of the dual-slope ADC conversion cycle; and wherein the dual-slope ADC is configured to output a digital value relating to the second slope time duration, wherein the second slope time duration relates to a temperature.

In one or more embodiments, the first slope time duration relates to a first reference current value, the second slope time duration relates to a second reference current value and wherein the dual-slope ADC is configured to output a digital value relating to a ratio of the first current reference value and the second reference current value, the ratio relating to the temperature of the current reference.

BRIEF DESCRIPTION OF THE DRAWINGS

In the figures and description like reference numerals refer to like features. Embodiments are now described in detail, by way of example only, illustrated by the accompanying drawings in which.

DETAILED DESCRIPTION OF EMBODIMENTS

Figure 1:
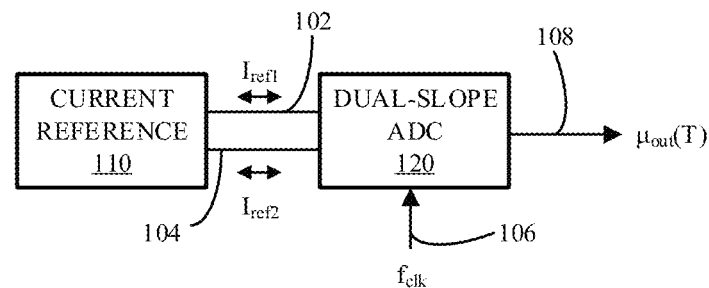
FIG. 1 shows a temperature sensor according to an embodiment.

FIG. 1 shows a temperature sensor 100 according to an embodiment. The temperature sensor 100 includes a current reference 110 and a dual-slope analog to digital converter (ADC) 120. The current reference 110 may have a first current reference terminal 102 configured to provide (source or sink) a first reference current $I_{ref1}$. The current reference 110 may have a second current reference terminal 104 configured to provide (source or sink) a second reference current $I_{ref2}$. The dual-slope ADC 120 has first and second terminals respectively connected to the first and second current reference terminals 102, 104. The dual-slope ADC 120 has a clock input 106 and a digital output 108. As the skilled person is aware a dual-slope ADC is a type of integrating ADC that typically converts an analog input signal (voltage or current) to a digital word. Each dual-slope integration cycle includes a first (fixed) time period where an input signal is integrated typically by charging a capacitor and a second time period during which the capacitor is discharged to a reference voltage value. The second time period can vary and is measured by a digital circuit for example a counter or other timer circuit which is incremented until the reference voltage is reached or crossed. Once the reference voltage is reached or crossed, the digital counter or timer value is a measure for the input signal value.

In operation, the current reference 110 may function as a temperature sensor front-end. At least one of the reference currents $I_{ref1}$, $I_{ref2}$ varies depending on the temperature. The current reference 110 may either source or sink the reference current selected by the dual-slope ADC 120 depending on the specific implementation. The dual-slope ADC 120 selects one of the first and second reference currents $I_{ref1}$, $I_{ref2}$. The dual-slope ADC 120 may source or sink the selected reference current for a first time period having a first slope time duration. In the first time period of the dual-slope integration cycle, the dual-slope ADC 120 may integrate the selected reference current by charging a capacitor (not shown) from an initial reference voltage for a predetermined time duration i.e. for a fixed number of clock cycles at frequency $f_{clk}$. Alternatively, during this first time period, the dual-slope ADC 120 may charge a capacitor until a predetermined (reference) voltage is reached. This first slope time duration then corresponds to the number of clock cycles of the clock received on the clock input 106 while the capacitor is charging.

During a second period of the dual-slope integration cycle, the dual-slope ADC 120 selects the other of the first and second reference currents $I_{ref1}$, $I_{ref2}$ i.e., the reference current which was not selected in the first time period. During this second time period, the dual-slope ADC 120 may source or sink the selected reference current for a second slope time duration during which the dual-slope ADC 120 may discharge the integration capacitor until the capacitor voltage reaches or crosses the initial reference voltage value. In some examples the operation of the dual-slope ADC may be inverted so that the voltage may decrease for a first slope time duration and increase for a second slope time duration. In these examples, during the first time period, a capacitor may be discharged for a fixed amount of time from an initial reference voltage value and in the second time period, the capacitor may be charged for a variable amount of time until the initial reference voltage value is reached. In some examples the direction of the first and second reference currents $I_{ref1}$, $I_{ref2}$ may be the same where the current reference acts as a current source or sink in both time periods. This may be the case for example for a differential implementation of the dual-slope ADC where the current is provided to different plates of the capacitor during first and second time periods. In other examples the direction of the first and second reference currents $I_{ref1}$, $I_{ref2}$ may be different or opposite.

The dual-slope ADC 120 may output a digital codeword on the digital output 108 denoted $\mu_{out}(T)$ that relates to the ratio of the reference currents $I_{ref1}$, $I_{ref2}$. Because the reference current values have known and different temperature dependencies, the ratio of the reference currents $I_{ref1}$, $I_{ref2}$ is related to the temperature of the current reference 110. In some examples, one of the reference currents $I_{ref1}$, $I_{ref2}$ does not vary with temperature. In some examples $I_{ref1}$ may include or be a proportional to absolute temperature (PTAT) current ($I_{PTAT}$) and $I_{ref2}$ may include or be a complementary to absolute temperature (CTAT) current ($I_{CTAT}$) or vice-versa. In some examples, one or both of $I_{ref1}$ and $I_{ref2}$ may include or be a combination of a PTAT and CTAT current. In some examples, if the first time period is fixed, a value relating to the ratio of the reference currents may be determined from the second time period only. If the first time period varies, the ratio of the reference current is determined from both the first time period and the second time period.

The temperature sensor 100 may combine high accuracy and high resolution with small area and low current consumption. Compared with some other temperature sensors, use of a dual-slope ADC may result in lower switching noise and/or thermal noise. In some examples, the dual-slope ADC 120 quantizes a temperature-dependent ratio between a (combination of a) CTAT and PTAT current. In these examples the current reference 110 may generate the $I_{PTAT}$ and $I_{CTAT}$ currents using a diode and/or bipolar junction transistor (BJT)-based circuit similar to those used in voltage references.

By using a dual-slope ADC converter as a read-out circuit, the temperature sensor 100 may have reduced switching noise and improved thermal-noise rejection. Compared to a ΣΔ-modulator, a dual-slope architecture may require only a few switching activities for each conversion and may have longer integration times, which may be beneficial for averaging thermal noise. Furthermore, the output of the dual-slope ADC does not require an additional bulky decimation filter which is generally required when using a ΣΔ-modulator. By avoiding the decimation filter, the overall power consumption and area can be considerably reduced, especially in relatively larger technology nodes, for example 140 nm.

Figure 2:
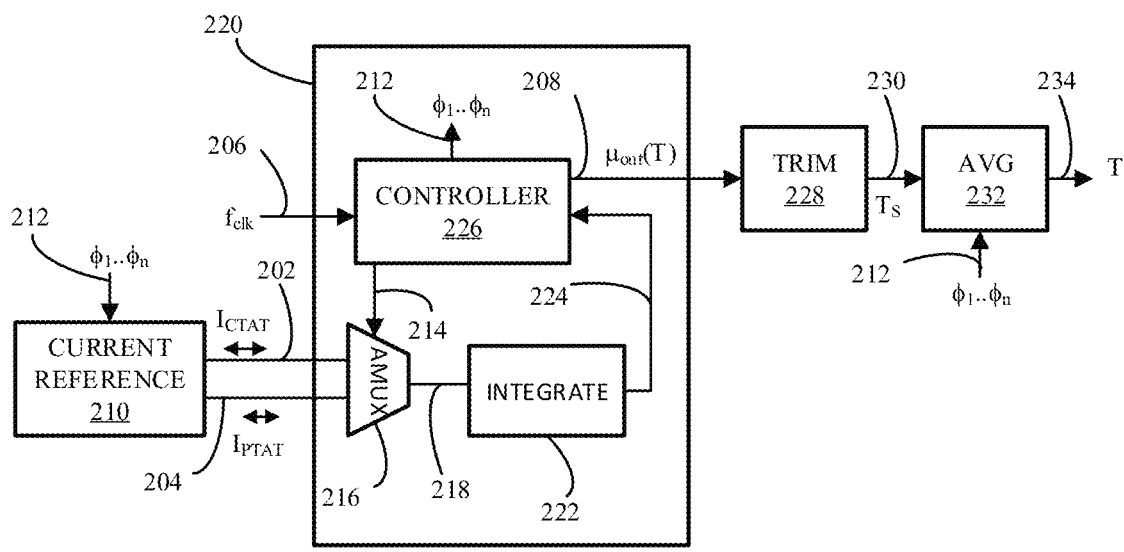
FIG. 2 illustrates a temperature sensor according to an embodiment.

FIG. 2 shows a temperature sensor 200. The temperature sensor 200 includes a current reference 210, a dual-slope analog to digital converter (ADC) 220, a trimmer 228 and an averager 232. The current reference 210 has a first current reference terminal 202 configured to provide (source or sink) a first reference current $I_{ref1}$ which as illustrated is a CTAT current $I_{CTAT}$. The current reference 210 has a second current reference terminal 204 configured to provide (source or sink) a second reference current $I_{ref2}$ which as illustrated is a PTAT current $I_{PTAT}$. The current reference 210 includes a switch control input which may be used to select one of multiple circuit elements (not shown) in the current reference 210 for providing dynamic element matching (DEM).

The dual-slope ADC 220 has first and second terminals respectively connected to the first and second current reference terminals 202, 204. The dual-slope ADC 220 has a clock input 206, a digital output 208 and a switch control output 212. The dual-slope ADC 220 further includes a controller 226, an analog multiplexer 216 and an integrator 222. The controller 226 as a first input connected to the clock input 206. The controller 226 has switching control output 212 which may provide one or more switching control signals denoted $\varphi_1$–$\varphi_n$ to the current reference switch control input and the average 232. The controller 226 has a second input which is connected to an output 224 of the integrator 222. The controller 226 has a mux control output 214 which is connected to a control input of the analog multiplexer 216. The controller 226 as a digital word output which is connected to the digital output 208 of the dual-slope ADC 220.

The analog multiplexer 216 has a first terminal connected to the first current reference terminal 202. The analog multiplexer 216 has a second terminal connected to the second current reference terminal 204. The analog multiplexer 216 has a third terminal connected to the integrator input 218.

The digital output 208 is connected to an input of the trimmer 228. The trimmer output 230 is connected to an input of the averager 232. The output of the averager 232 is connected to the temperature sensor output 234.

In operation, the current reference 210 may function as a temperature sensor front-end. The current reference 210 may either source or sink the selected reference current depending on the specific implementation of the dual-slope ADC 120. During the first time period of the dual-slope conversion cycle, the controller 226 may control the analog multiplexer 216 to couple the first current reference terminal to the integrator input 218 which as illustrated then provides $I_{CTAT}$. The dual-slope ADC 120 may source or sink the selected reference current for a first slope time duration. In the first period of the dual-slope integration cycle, the integrator 222 may integrate the $I_{CTAT}$ reference current by for example charging a capacitor (not shown) from an initial reference voltage for a predetermined time duration. This first time period or first slope time duration corresponds to a number of clock cycles of the clock received by the controller 226 on the clock input 206.

During the second time period of the dual-slope integration cycle the controller 226 may control the analog multiplexer 216 to couple the second current reference terminal 204 to the integrator input 218 which as illustrated then provides $I_{PTAT}$. The dual-slope ADC 220 may source or sink the selected reference current for a second slope time duration during which the integrator 222 may for example discharge a capacitor until the voltage reaches the reference voltage. Once the reference voltage is reached, the integrator 222 may output a signal to the controller 226 to indicate the end of the dual-slope conversion cycle. At this point, the controller 226 may output a digital codeword on the digital output 208 denoted $\mu_{out}(T)$ which is related to the temperature being sensed by the current reference 210.

After each conversion cycle the controller may output switch control signals to change the dynamic element matching circuit elements being used in the current reference 210 for the next conversion cycle. The codeword $\mu_{out}(T)$ generated at each conversion cycle may be trimmed by trimmer 228 which may then provide a trimmed value $T_s$ to the averager 232. In one example, the trimmed value may be determined by equation 1 below:

$$T_s = \frac{1}{a_0 + \mu_{out} + a_1 + a_2 \ln(a_0 \cdot \mu_{out} + a_1)} + b \quad (1)$$

Where $a_0$, $a_1$, $a_2$ are parameters determined by batch calibration and b is a parameter determined by a sample-specific single-temperature (1T) trim. The averager 232 may average the trimmed value $T_s$ over several (sub-)conversions determined by the number of DEM elements and switch control signals to compensate for variations in circuit element tolerance in the current reference 210.

In another example, the trimmed value may be determined only using a 1T trim value by:

$$T_s = \frac{\alpha\prime}{\mu_{out} + \alpha\prime} \quad (2)$$

For this example, following averaging a scaling factor may be applied by a scaler (not shown) using a 3rd order polynomial determined by batch calibration. The temperature sensor 200 may combine high accuracy and resolution with small area and low current consumption. The dual-slope ADC 220 may minimize the switching noise and thermal noise in the temperature sensor, which may improve the accuracy of the temperature reading. Furthermore, by trimming and averaging the output value of the dual-slope ADC, the accuracy of the temperature reading may be further improved by reducing inaccuracies due to component mismatch and flicker noise. Chopping and DEM, over multiple sub conversion may be leveraged to both reduce the impact of flicker noise and the impact of mismatch errors on the error in the temperature sensor. By averaging the results of chopping and DEM over multiple sub conversion may improve the accuracy of the determined temperature value.

Figure 3A:
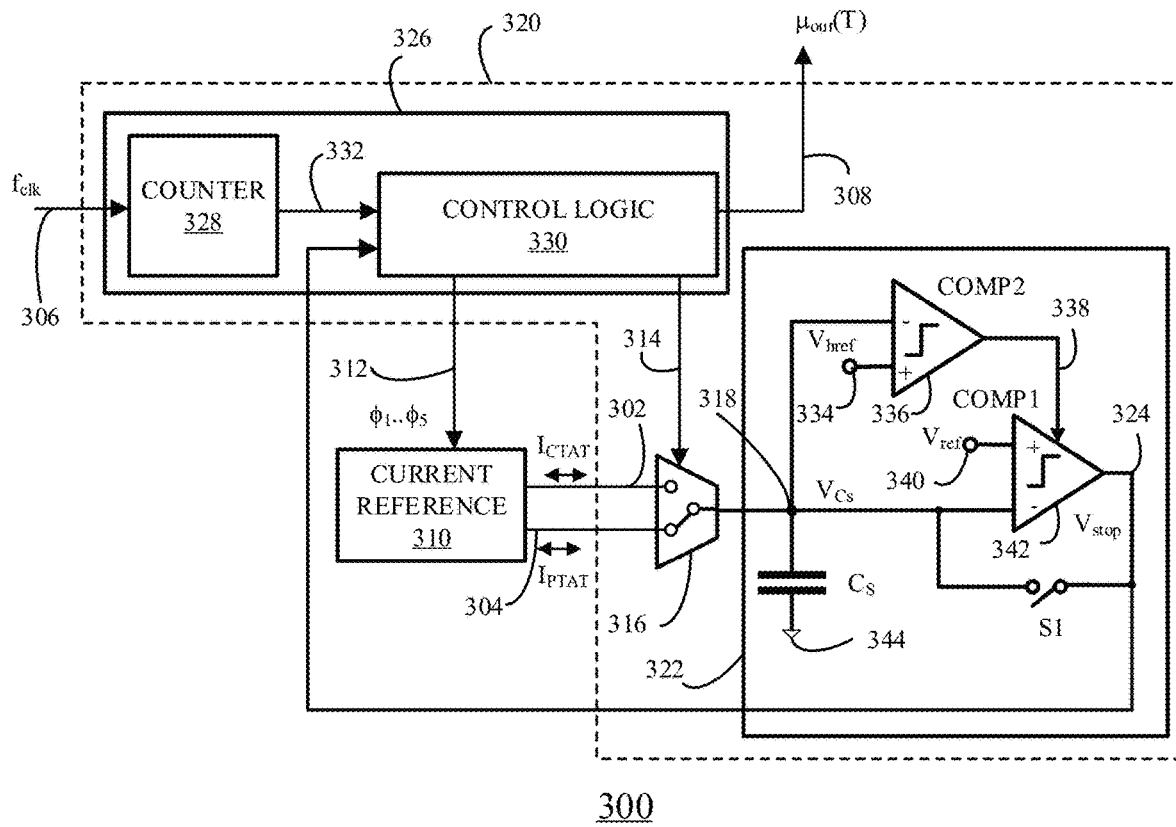
FIG. 3A shows a temperature sensor according to an embodiment.

FIG. 3A shows a temperature sensor 300. The temperature sensor 300 includes a current reference 310, and a dual-slope analog to digital converter (ADC) 320. The current reference 310 has a first current reference terminal 302 configured to provide (source or sink) a first reference current $I_{ref1}$ which as illustrated is a CTAT current $I_{CTAT}$. The current reference 310 has a second current reference terminal 304 configured to provide (source or sink) a second reference current $I_{ref2}$ which as illustrated is a PTAT current $I_{PTAT}$. The current reference 310 includes a switch control input which may be used to select one of multiple circuit elements (not shown) in the current reference 310 for providing dynamic element matching (DEM) and control of chopping amplifiers (not shown).

The dual-slope ADC 320 has first and second terminals respectively connected to the first and second current reference terminals 302, 304. The dual-slope ADC 320 has a clock input 306, a digital output 308 and a switch control output 312. The dual-slope ADC 320 further includes a controller 326, an analog multiplexer 316 and an integrator 322.

The controller 326 includes a counter 328 which may for example be implemented by a 13-bit ripple counter and control logic 330 which may for example implement a state-machine and control registers. The counter 328 has an input connected to the clock input 306 and a counter output 332 connected to a first input of the control logic 330. The control logic 330 has a switching control output 312 which may provide one or more switching control signals, in this example 5 signals denoted $\varphi_1$–$\varphi_5$, to the current reference switch control input. The controller 326 has a second input which is connected to an output 324 of the integrator 322. The control logic 330 has a mux control output 314 which is connected to a control input of the analog multiplexer 316. The control logic 330 has a digital word output which is connected to the digital output 308 of the dual-slope ADC 320.

The analog multiplexer 316 has a first terminal connected to the first current reference terminal 302. The analog multiplexer 316 has a second terminal connected to the second current reference terminal 304. The analog multiplexer 316 has a third terminal connected to the integrator input 318.

The integrator 322 has a sampling capacitor $C_s$, a first comparator 342 (COMP1) a second comparator 336 (COMP2) and a switch S1. The integrator input 318 may be connected to an inverting input of the second comparator 336, an inverting input of the first comparator 342, a first terminal of the sampling capacitor $C_s$, and a first terminal of the switch S1. Second terminal of capacitor $C_s$ may be connected to a ground 344. The output of the first comparator 342 may be connected to the integrator output 324 and the second terminal of the switch S1. The second comparator output 338 may be connected to an enable input of the first comparator 342. The noninverting input 340 of the first comparator 342 may be connected to a first voltage reference $V_{ref}$. The noninverting input 334 of the second comparator 336 may be connected to a second voltage reference $V_{href}$. The control logic 330 may have a connection (not shown) to control the operation of switch S1. In other examples, an integrator may be implemented using an op-amp and capacitor in a current integration configuration.

The temperature sensor 300 may perform a temperature to digital conversion by a ratio-metric conversion of the CTAT and PTAT current to a digital codeword $\mu_{out}$ (T). The integrator 322 charges or discharges $C_s$ which results the voltage difference $V_{CS}$ between the first and second terminals of the sample capacitor $C_s$ increasing or decreasing. The first comparator 342 generates a stop signal $V_{stop}$ indicating the end of the conversion cycle and operates at higher power levels compared with the second comparator 336; this may reduce input-referred noise and delay in the signal path. The second comparator 336 which may have relatively lower power consumption and lower accuracy, duty-cycles the first comparator 342 by controlling the enable signal and hence reduces overall power consumption. The voltage reference $V_{href}$ is slightly greater than $V_{ref}$ to enable timely enabling of the first comparator 342 close to the cross point of the sample capacitor voltage $V_{CS}$ and the reference voltage $V_{ref}$ supplied to the first comparator 342. In this context the term "slightly greater" may mean the $V_{href}$ is sufficiently higher than $V_{ref}$ to account for the settling time of the first comparator 342 once enabled before the capacitor voltage $V_{cs}$ reached $V_{ref}$.

Figure 3B:
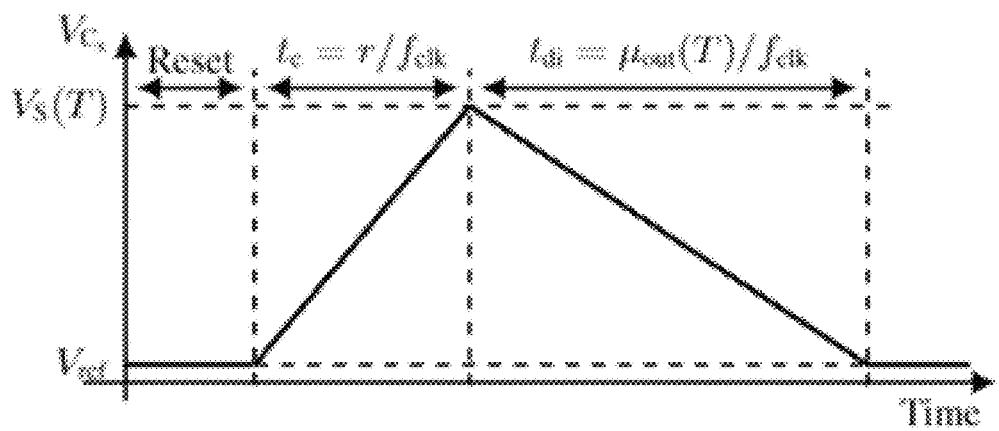
FIG. 3B illustrates an example conversion cycle of the dual-slope converter in the temperature sensor of FIG. 3A.

FIG. 3B shows a plot 350 illustrating the variation of voltage across the sample capacitor $V_{CS}$ during a single conversion cycle of the dual-slope converter 320. Initially, during a "reset" period, the first comparator 342 may be used as a voltage buffer by closing switch S1 to reset $V_{CS}$ to $V_{ref}$, which serves to auto-zero the first comparator 342. The first comparator 342 may for example be implemented by an op-amp with high loop gain. The switch S1 is then opened and in a first period of the dual-slope integration cycle $t_c$, the sample capacitor $C_s$ is charged by $I_{CTAT}$ for r-cycles of $f_{clk}$, relating to a first slope time duration. During a second period of the dual-slope integration cycle $t_{di}$ the sample capacitor $C_s$ is discharged (i.e. de-integrated) with $I_{PTAT}$ until $V_{CS}$ crosses $V_{ref}$ relating to a second slope time duration. This time $t_{di}$ which takes $\mu_{out}$(T)-cycles of $f_{clk}$. The conversion cycle implements the ratio-metric conversion of the CTAT and PTAT current. During the second period when the sample capacitor voltage ($V_{CS}$) is less than the voltage reference $V_{href}$ the second comparator 336 enables the first comparator 342 and then when the sample capacitor voltage reaches $V_{ref}$, the first comparator outputs the stop signal $V_{stop}$ indicating the end of the dual-slope conversion cycle. It follows that:

$$h(T) = \frac{I_{CTAT}}{I_{PTAT}} \tag{3}$$

$$\mu_{out}(T) = r \cdot h(T) \tag{4}$$

The ratio h(T) is scaled by r which the number of cycles in the first period, and which is utilized to set the minimum least-significant-bit (LSB)-step at high temperatures where $\Delta h/\Delta T$ is the smallest. In this example, $\mu_{out}$ (T) is quantized to the nearest integer number by the dual-slope architecture. After each conversion cycle the control logic may output switch control signals 312 to change the dynamic element matching circuit elements being used in the current reference 310 for the next conversion cycle.

Figure 4A:
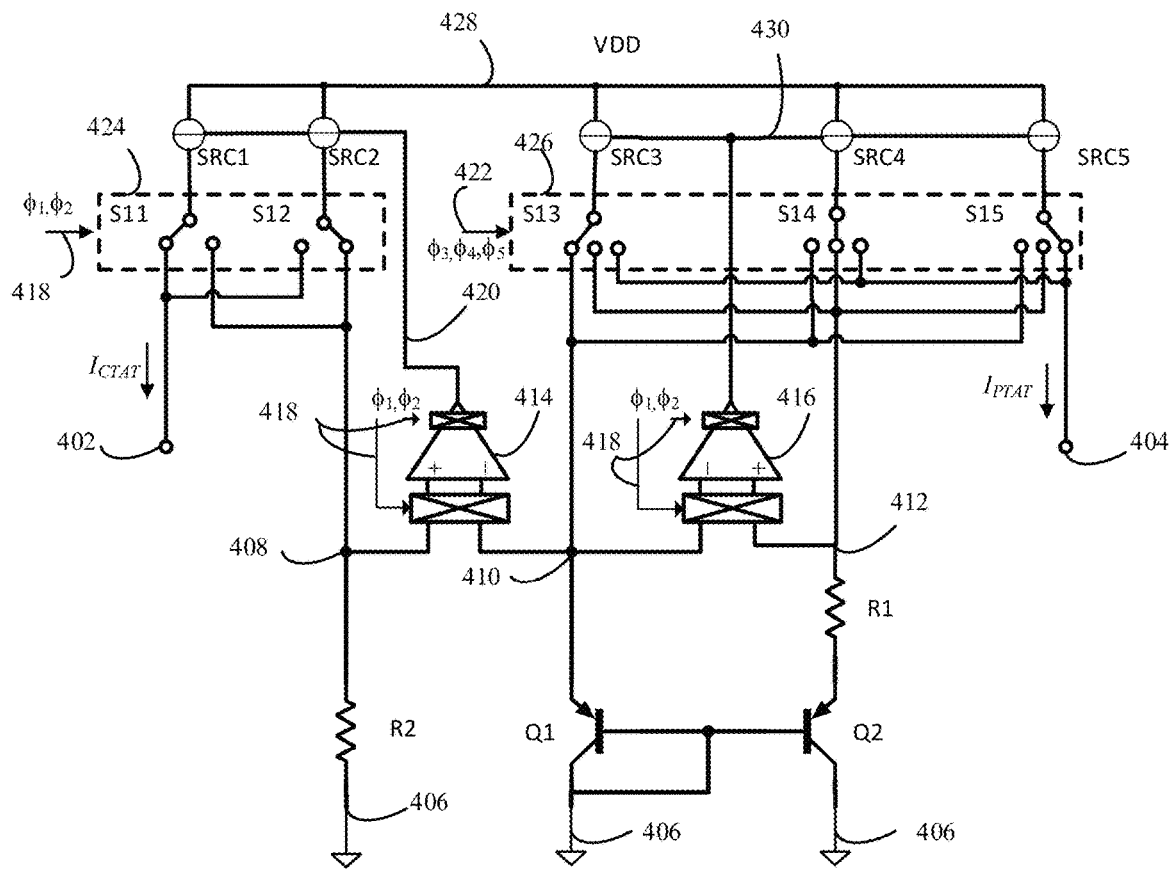
FIG. 4A illustrates a current reference for a temperature sensor front-end in the temperature sensor according to an embodiment.

FIG. 4A shows an example of a current reference 400 which may be used as a temperature sensing front-end to implement current reference 310. The current reference 400 includes current sources SRC1, SRC2, SRC3, SRC4, SRC5, first switching network 424 consisting of switches S11 and S22, second switching network 426 consisting of switches S13, S14, S15, first and second chopping amplifiers 414, 416, resistors R1, R2, and a current mirror formed by transistors Q1 and Q2.

Current sources SRC1-5 are connected to a supply 428 (VDD). The current sources SRC1, SRC2 are connected to the first chopper amplifier output 420. The current sources SRC1, SRC2 are connected to the first switching network 424. The current sources SRC3, SRC4, SRC5 are connected to the second chopper amplifier output 430. The current sources SRC3, SRC4, SRC5 are connected to the second switching network 426.

The current mirror including transistors Q1 and Q2 may have a common base connection connected to ground 406. The collector of transistor Q2 may also be connected to ground 406. The circuit node 410 is connected to a first input of chopper amplifiers 414, 416. A resistor R1 may be connected between circuit node 412 and the emitter of transistor Q2. The circuit node 412 may also be connected to a second input of second chopper amplifier 416 and the second switching network 426. The circuit node 408 is connected to the second input of the first chopper amplifier 414. The resistor R1 is connected between circuit node 408 and ground 406.

For a particular conversion cycle, the first switching network 424 may be controlled by switching control input 418 which provides switch control signals $\varphi_1$, $\varphi_2$. The first switching network 424 may couple one of the first current source SRC1 and the second current source SRC2 to the first current reference terminal 402. The first switching network 424 may be controlled by switch control signals $\varphi_1$, $\varphi_2$ to couple the other of the first current source SRC1 and the second current source SRC2 to circuit node 408. The connections of SRC1, SRC2 may then be swapped in a subsequent conversion cycle. Similarly, switch control signals $\varphi_1$, $\varphi_2$ may control the chopping circuitry in chopping amplifiers 414,416.

During a dual-slope ADC conversion cycle, the second switching network 426 may be controlled by switching control input 422 which provides switch control signals $\varphi_3$, $\varphi_4$, $\varphi_5$. During each conversion cycle the current sources SRC3, SRC4, SRC5 may each be coupled to only one of circuit node 410, circuit node 412, and the second reference current terminal 404.

Figure 4B:
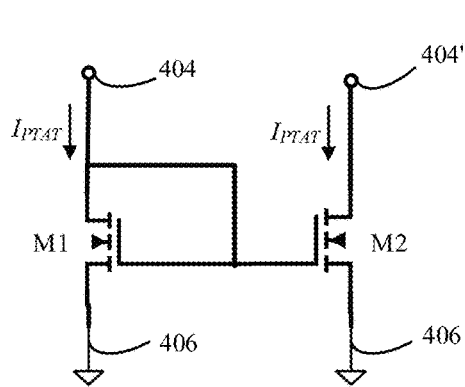
FIG. 4B illustrates an example current sink circuit for the current reference of FIG. 4A.
Figure 4C:
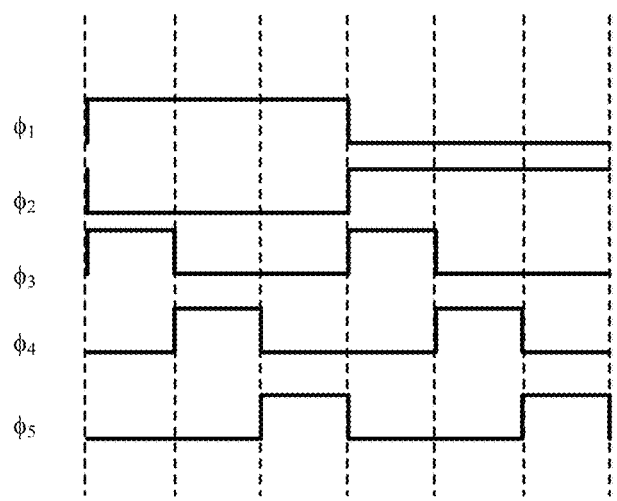
FIG. 4C shows a waveform of switch control signals for the current reference of FIG. 4A.

In current reference 400, six phases are generated from switch signals $\varphi_1$–$\varphi_5$ to average the most important causes of mismatch and flicker noise. Waveform 450, illustrated in FIG. 4C, shows one example of how the switch signals may be generated. In other examples, the number of phases may be larger or smaller to either increase the accuracy and hence reduce the conversion speed or vice versa. Similarly, in some examples the number of current sources may be increased or decreased. In some examples the chopping amplifiers may be replaced by amplifiers without chopping, for example simple op-amps. In some examples if dynamic element matching is not required, first switching network 424 and second switching network 426 may be removed.

Figure 5A:
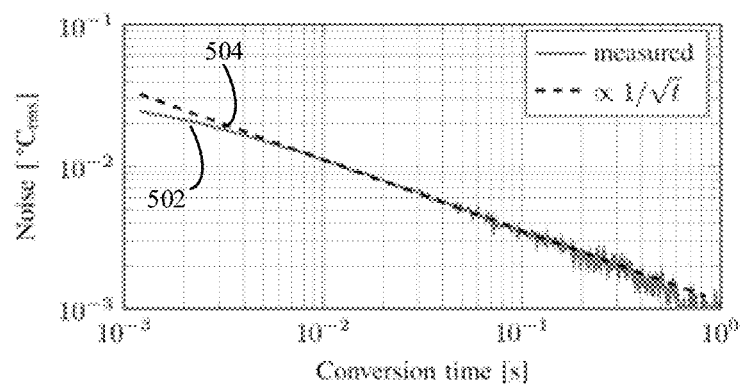
FIG. 5A shows a graph of measured temperature resolution for the temperature sensor of FIG. 3 with the current reference of FIG. 4.

Current reference 400 is based on PNP transistors Q1, Q2, but other examples may use NPN transistors or diodes. The current reference 400 generates a CTAT, and PTAT current $I_{CTAT}$ and $I_{PTAT}$, respectively at current generation reference terminals 402, 404. The CTAT current $I_{CTAT}$, in the current reference 400 is obtained by applying the base-emitter voltage $V_{BE}$ across $R_2$, which can be expressed as $$I_{R2} = I_{CTAT} = \frac{kT\ln(I_C/I_S)}{qR_2} \quad (5)$$

where k is the Boltzmann constant, T the temperature in Kelvin, $I_c$ the collector current of $Q_1$, $I_s$ the saturation current, and q the electron charge. For current reference 400, the voltage drop across resistor $R_1$ equals the base-emitter voltage difference $\Delta V_{BE}=(kT/q)\ln(n)$ of the two differently sized PNPs Q1, Q2 (1:n). The current through $R_1$ can be expressed as $$I_{R1} = I_{PTAT} = \frac{kT\ln(n)}{qR_1} \quad (6)$$

which shows PTAT-behavior. The ratio h between $I_{CTAT}$ and $I_{PTAT}$ can be expressed by $$h(T) = \frac{I_{CTAT}}{I_{PTAT}} = \frac{R_1}{R_2\ln(n)} \cdot \left(\ln\left(\frac{k\ln(n)}{qR_1DT^{1.5}}\right) + \frac{E_G}{kT}\right) \quad (7)$$

where its temperature dependency is mainly dominated by $E_G/(kT)$ and hence is inversely proportional to T. A ratio h that is PTAT could, for example, be obtained by comparing a PTAT and temperature-independent current. measurement time in seconds. The dashed line 504 indicates a tangent that follows 1/sqrt(measurement time). If the measurement follows this line it indicates that rms-noise of the sensor is likely white-noise. At room temperature, the temperature sensor showed 833 conversion/s with an rms-resolution of 25° Celsius_RMS which corresponds to a resolution Figure-of-Merit of 16.4 pJ K$^2$. The resolution is higher compared with the minimum step size of roughly 100 mK. This is due to noise during the conversion which causes dithering; averaging the six phases improves the resolution. To increase the resolution more, multiple conversion cycles can be averaged as a trade-off with the conversion time, as shown in FIG. 5A. The rms-resolution is limited by thermal noise and roughly reduces with the square root of the conversion time.

As illustrated, current reference 400 generates an $I_{PTAT}$ and $I_{CTAT}$ current source. For examples where one of the reference currents is required to be a sink current, an additional current mirror may be used. FIG. 4B shows an example current mirror 440 based on N-type MOSFETs M1, M2. As illustrated, the drain of M1 is connected to current reference terminal 404 which supplies $I_{PTAT}$, this current is mirrored by transistor M2 which then acts as a current sink. The current sink reference terminal 404' is connected to the drain of transistor M2. This current sink reference terminal 404' may then be connected to dual-slope ADC (not shown) instead of current reference terminal 404. In some examples, a chopping current mirror similar to the mirror circuit and chopping amplifiers in current reference 400 may be used instead of current mirror 440. In some examples bipolar transistors may be used instead of MOS transistors for current mirror 440. It will be appreciated that a similar circuit may also be used for $I_{CTAT}$ if required.

Figure 5B:
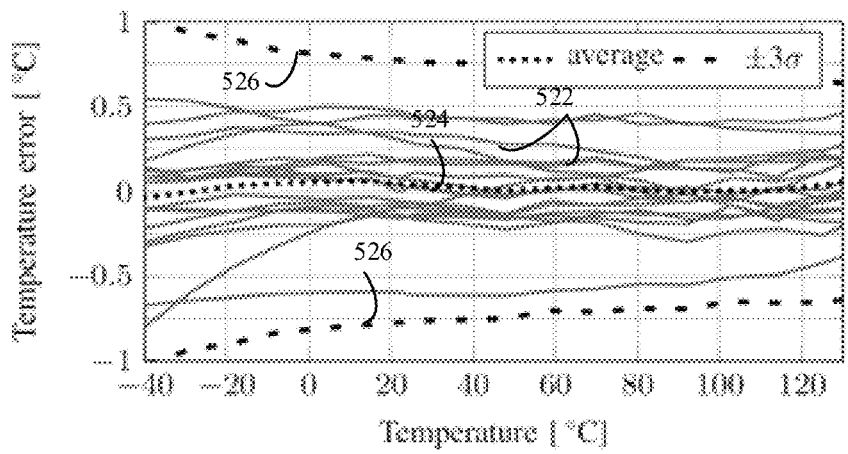
FIG. 5B shows a graph of the untrimmed temperature inaccuracy of 18 measured samples of the temperature sensor of FIG. 3 with the current reference of FIG. 4.
Figure 5C:
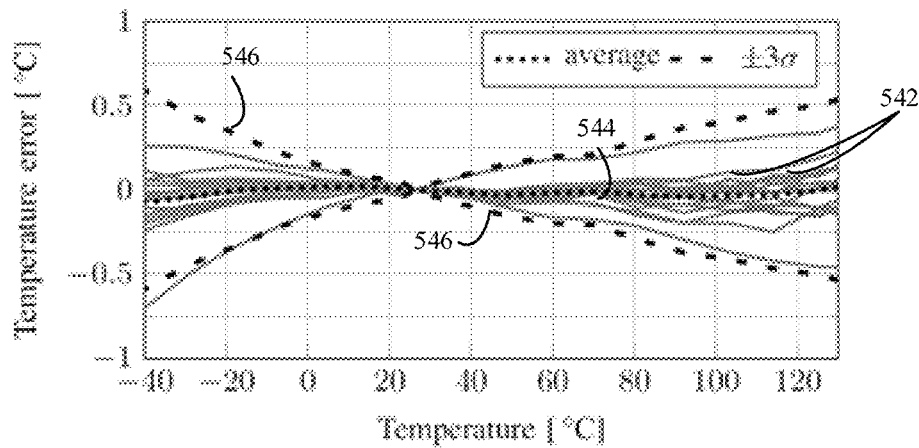
FIG. 5C shows a graph of the temperature inaccuracy of 18 measured samples of FIG. 5B after a sample-specific 1T-trim at room temperature.

FIG. 5B shows a graph 520 of the untrimmed temperature inaccuracy of 18 measured samples 522. The Y axis shows the temperature measurement error in Celsius between −1 and +1. The x-axis shows the temperature in Celsius between −40 and +125. The temperature error stays within ±1° C.(3σ) shown by lines 526. The average error is shown by line 524. FIG. 5C shows a graph 540 of the temperature inaccuracy of 18 measured samples 542 after a sample-specific 1T-trim at room temperature. The Y axis shows the temperature measurement error in Celsius between −1 and +1. The x-axis shows the temperature in Celsius between −40 and +125. In this case the spread is reduced to ±0.6° C.(3σ) shown by lines 546. The average error is shown by line 544. The supply sensitivity of the temperature sensor which may also be referred to as a temperature to digital converter (TDC) is approximately 0.75° C./Volt over a voltage range from 1.35V to 1.65V.

Figure 6:
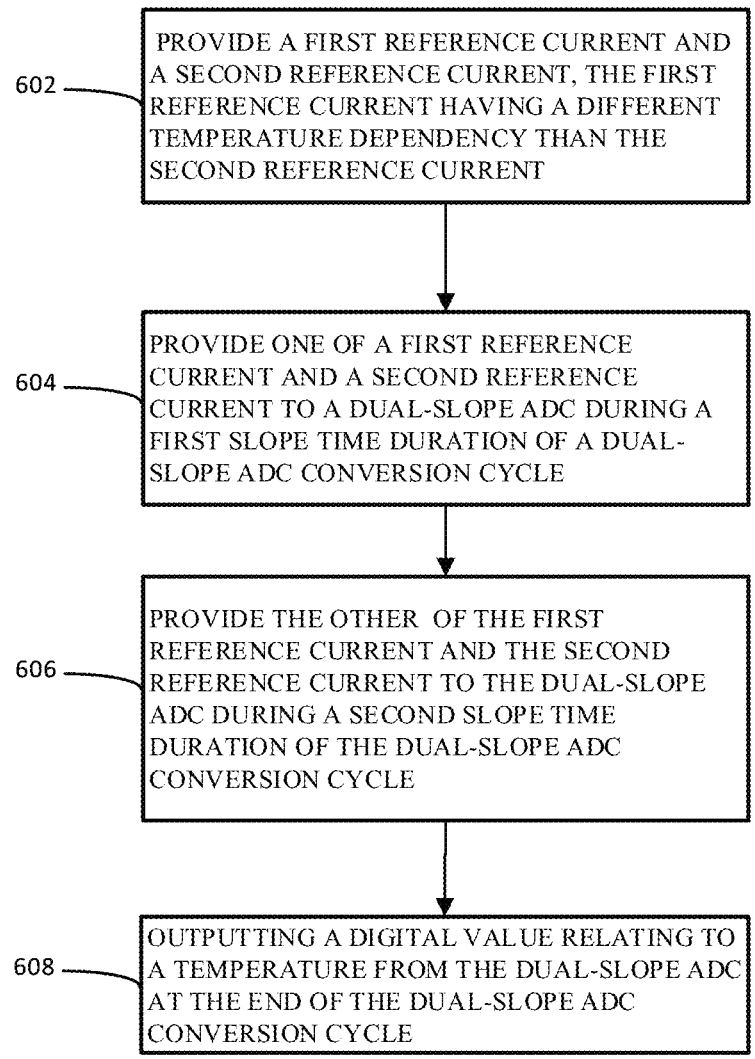
FIG. 6 illustrates a method of temperature sensing according to an embodiment.

FIG. 6 shows a method of temperature sensing 600. In step 602, a first reference current and a second reference current is provided, the first reference current having a different temperature dependency from that of the second reference current. In step 604, one of the first reference current and the second reference current is provided to a dual-slope ADC during a first slope time duration of a dual-slope ADC conversion cycle. In step 606, the other of the first reference current and the second reference current is provided to the dual-slope ADC during a second slope time duration of the dual-slope ADC conversion cycle. In step 608, a digital value relating to temperature is output at the end of the dual-slope ADC conversion cycle.

The temperature sensors and methods described herein may provide high accuracy and resolution over temperature, supply, and process variations with small area and low power. The temperature sensors may provide high untrimmed accuracy with optionally single-temperature trim for increased accuracy. Embodiments described herein may provide high conversion speed while simultaneously achieving high resolution in each conversion. In addition, the temperature sensor may be easily scalable dependent on the required resolution/conversion rate and power.

In some examples, the temperature-dependent ratio can be designed to be proportional or to have some other temperature dependency by choosing, for example, $I_{PTAT}/(I_{PTAT}+I_{CTAT})$ or $I_{CTAT}/I_{PTAT}$. This temperature dependency can be set by using specific (different) combinations of the $I_{PTAT}$ and $I_{CTAT}$ currents for currents that determine the rising and falling edge of the dual-slope converter. In some examples, per-readout-period chopping of various parts of current reference circuits may be implemented (for example amplifiers and mirrors), yielding a number of different circuit permutations that may be used to implement calibration in the digital domain. A partial set of all possible permutations may allow a temperature detection system including examples of the temperature sensor described herein to digitally calibrate the temperature against all mismatch sources. This calibration may be done during a production trimming step or using BIST (Built-In Self-Test) during production or in the field.

Embodiments described herein may be implemented in hardware or as a combination of hardware and software. It will be appreciated that the switches illustrated in various embodiments may be implemented using MOS transistors, bipolar transistors or similar. A single connection illustrated may include multiple connections in parallel such as for example a signal bus.

A temperature sensor and method of temperature sensing is described. A first reference current is provided to a dual-slope ADC during a first slope time duration of a dual-slope ADC conversion cycle. A second reference current is provided to the dual-slope ADC during a second slope time duration of the dual-slope ADC conversion cycle. A digital codeword relating to a ratio of the first and second reference currents temperature is then output by the dual-slope ADC. The first and second reference current ratio is related to the temperature.

In some example embodiments the set of instructions/method steps described above are implemented as functional and software instructions embodied as a set of executable instructions which are affected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

Although the appended claims are directed to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness, it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A temperature sensor comprising:
   a current reference configured to provide a first reference current and a second reference current, the first reference current having a different temperature dependency from that of the second reference current; and
   a dual-slope analog to digital converter, ADC, coupled to the current reference and having a clock input and a digital output;
   wherein the current reference is further configured to:
   provide a one of the first reference current and the second reference current, for a first slope time duration of a dual-slope ADC conversion cycle; and
   provide the other of the first reference current and the second reference current for a second slope time duration of the dual-slope ADC conversion cycle; and
   wherein the first slope time duration relates to a first reference current value, the second slope time duration relates to a second reference current value and wherein the dual-slope ADC is configured to output a digital value related to a ratio of the first current reference value and the second reference current value, the ratio relating to a temperature.

2. The temperature sensor of claim 1, wherein the first reference current comprises a complementary-to-absolute-temperature, CTAT, current, and the second reference current comprises a proportional-to-absolute-temperature, PTAT, current.

3. The temperature sensor of claim 1, wherein the first reference current comprises a PTAT current, and the second reference current comprises a CTAT current.

4. The temperature sensor of claim 1, wherein one of the first reference current and the second reference current varies dependent on the temperature and the other of the first reference current and the second reference current does not vary dependent on the temperature.

5. The temperature sensor of claim 1, wherein the dual-slope ADC comprises an integrator, the integrator comprising a sampling capacitor and wherein a direction of the first reference current through the integrator is opposite to the direction of the second reference current.

6. The temperature sensor of claim 5, wherein:
   the first slope time duration is a time for a voltage difference between a first and second terminal of the sampling capacitor to increase from a first voltage value to a second voltage value; and
   the second slope time duration is a time for the voltage difference to decrease from the second voltage value to the first voltage value.

7. The temperature sensor of claim 5, wherein:
   the first slope time duration is a time for a voltage difference between a first and second terminal of the sampling capacitor to decrease from a first voltage value to a second voltage value; and
   the second slope time duration is a time for the voltage difference to increase from the second voltage value to the first voltage value.

8. The temperature sensor of claim 5, wherein the current reference comprises:

a first current reference terminal configured to a one of source and sink the first reference current;

a second current reference terminal configured to a one of source and sink the second reference current; and wherein the dual-slope ADC comprises:

a controller having a first control input coupled to the clock input, a second control input, a first controller output coupled to the digital output, and a second controller output;

wherein the integrator comprises an integrator input and an integrator output coupled to the second control input; and wherein the dual-slope ADC further comprises:

a multiplexer having a first multiplexer input coupled to the first current reference terminal, a second multiplexer input coupled to the second current reference terminal, a multiplexer output coupled to the integrator input and a multiplexer control input coupled to the second controller output; and wherein the controller is configured to control the multiplexer to couple the first current reference terminal to the integrator input for the first slope time duration and to couple the second current reference terminal to the integrator input for the second slope time duration.

9. The temperature sensor of claim 8, wherein the sampling capacitor is coupled between the integrator input and a ground, and wherein the integrator further comprises:

a first comparator having a first comparator first input coupled to a first reference voltage, a first comparator second input coupled to the integrator input, a first comparator enable input, and a first comparator output coupled to the integrator output;

a switch coupled between the first comparator output and the integrator input and configured to be closed between dual-slope ADC conversion cycles and open for the first and second slope time duration;

a second comparator having a second comparator first input coupled to a second reference voltage, a second comparator second input coupled to the integrator input, and a second comparator output coupled to the first comparator enable input;

wherein the second reference voltage is greater than the first reference voltage and wherein the second comparator is configured to enable the first comparator in response to a sampling capacitor voltage being less than the second reference voltage and the first comparator is configured to output an end of conversion signal in response to the sampling capacitor voltage being less than or equal to the first reference voltage.

10. The temperature sensor of claim 8, wherein the controller comprises a switching control output, and the current reference comprises a switching control input and a plurality of circuit elements for dynamic element matching; wherein the controller is further configured to control the current reference to change a circuit configuration of the current reference between a first dual-slope conversion cycle and a second dual-slope conversion cycle.

11. The temperature sensor of claim 10 wherein the current reference further comprises:

a first plurality of current sources coupled to a first switching network;

a second plurality of current sources coupled to a second switching network;

a first chopping amplifier having a first chopping amplifier first input, a first chopping amplifier second input, and a first chopping amplifier output;

a second chopping amplifier having a second chopping amplifier first input, a second chopping amplifier second input, and a second chopping amplifier output;

a current mirror comprising a first bipolar transistor and a second bipolar transistor;

a first resistor coupled between the second chopping amplifier second input and the second bipolar transistor;

a second resistor coupled between the first chopping amplifier second input and a ground;

wherein the first chopping amplifier first input is coupled to the second chopping amplifier first input and the first bipolar transistor; and wherein the switching control input comprises a first switching control input coupled to the first switching network; and a second switching control input coupled to the second switching network; and wherein the current reference is configured in a dual-slope conversion cycle to:

switchably couple a first current source of the first plurality of current sources to the first current reference terminal;

switchably couple a second current source the first plurality of current sources to the first chopping amplifier second input;

switchably couple a first current source of the second plurality of current sources to the second current reference terminal;

switchably couple a second current source of the second plurality of current sources to the first chopping amplifier first input, the second chopping amplifier first input, and the first bipolar transistor; and switchably couple a third current source of the second plurality of current sources to the second chopping amplifier second input, and the second bipolar transistor.

12. The temperature sensor of claim 1 further comprising:

a trimmer coupled to the digital output and configured to trim the digital output value dependent on at least one trimming parameter and to output a trimmed digital output value relating to a temperature.

13. The temperature sensor of claim 12 further comprising:

an averager coupled to the trimmer and configured to receive a plurality of trimmed digital output values from the trimmer; generate an average value of a plurality of the trimmed digital output values; and output the average value relating to a temperature.

14. A method of temperature sensing comprising:

providing a first reference current and a second reference current, the first reference current having a different temperature dependency from that of the second reference current;

providing a one of the first reference current and the second reference current to a dual-slope ADC during a first slope time duration of a dual-slope ADC conversion cycle;

providing the other of the first reference current and the second reference current to the dual-slope ADC during a second slope time duration of the dual-slope ADC conversion cycle; wherein the first slope time duration relates to a first reference current value, the second slope time duration relates to a second reference current value, and the method further comprises:

outputting a digital value from the dual-slope ADC, the digital value relating to a ratio of the first current reference value and the second reference current value, the ratio relating to a temperature.

15. The method of claim 14 wherein the first reference current comprises a complementary-to-absolute-temperature (CTAT) current, and the second reference current comprises a proportional-to-absolute-temperature (PTAT) current.

16. The method of claim 14 wherein the first reference current comprises a PTAT current, and the second reference current comprises a CTAT current.

17. The method of claim 14 wherein one of the first reference current and the second reference current varies dependent on the temperature and the other of the first reference current and the second reference current does not vary dependent on the temperature.

18. A temperature sensor comprising:
a current reference having a current reference first terminal, and a current reference second terminal; wherein the current reference first terminal is configured to source or sink a first reference current and the current reference second terminal is configured to source or sink a second reference current, the first reference current having a different temperature dependency than the second reference current;
a dual-slope analog to digital converter (ADC) comprising an integrator and having a clock input, a digital output, a dual-slope ADC terminal coupled to the current reference first terminal, and a dual-slope ADC second terminal coupled to the current reference second terminal;
wherein the dual-slope ADC is further configured to:
selectively couple one of the current reference first terminal and the current reference first terminal to the integrator for a first slope time duration of a dual-slope ADC conversion cycle; and
selectively couple the other of the current reference first terminal and the current reference first terminal to the integrator for a second slope time duration of the dual-slope ADC conversion cycle; and
wherein the dual-slope ADC is configured to output a digital value relating to the second slope time duration, wherein the second slope time duration relates to a temperature of the current reference.

19. The temperature sensor of claim 18 wherein the first reference current comprises a complementary-to-absolute-temperature (CTAT) current, and the second reference current comprises a proportional-to-absolute-temperature (PTAT) current.

20. The temperature sensor of claim 18 wherein the first slope time duration relates to a first reference current value, the second slope time duration relates to a second reference current value and wherein the dual-slope ADC is configured to output a digital value relating to a ratio of the first current reference value and the second reference current value, the ratio relating to the temperature.

* * * * *